United States Patent Office.

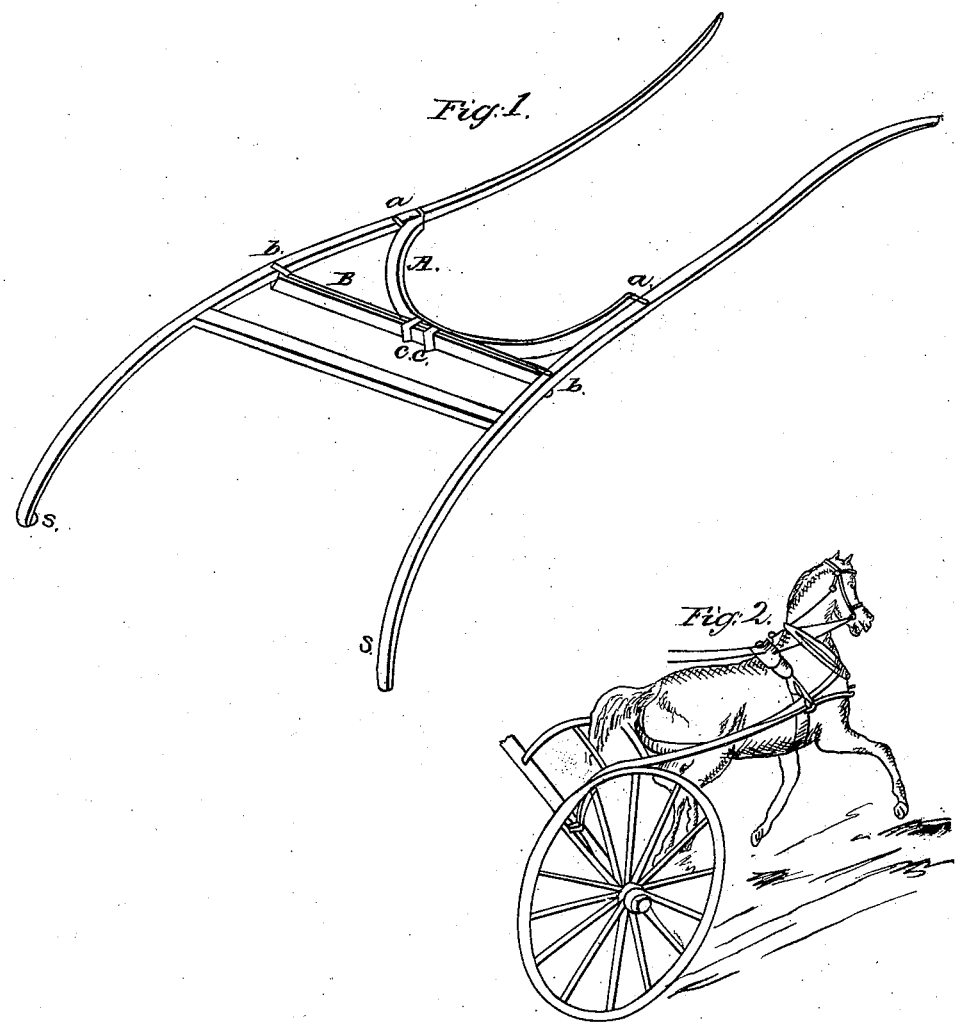

JACOB B. LINDEMAN, OF MANOR TOWNSHIP, PENNSYLVANIA.

Letters Patent No. 63,064, dated March 19, 1867.

IMPROVEMENT IN HARNESS.

*The Schedule referred to in these Letters Patent and making part of the same.*

TO ALL WHOM IT MAY CONCERN:

Be it known that I, JACOB B. LINDEMAN, of Manor Township, in the county of Lancaster, and State of Pennsylvania, have invented a new and improved mode of applying the breeching, usually attached to the Harness on horses, to perform the office of backing or holding back, when hitched between the shafts of vehicles; and I do hereby declare that the following is a full and exact description thereof, reference being had to the accompanying drawings, making a part of this specification, in which—

Figure 1 is a perspective view of the shafts and breeching.

Figure 2, the same, with the horse and harness.

The nature of my invention consists in attaching the breeching permanently to the shafts of the vehicle instead of forming a part of the harness, as it is now employed, being in every respect fully as efficient, if not more so, cheaper, and more convenient for hitching and unhitching the horse from the vehicle.

To enable others skilled in the art to make and use my invention, I will proceed to describe its construction and application, being more especially designed for such shafts that rise upwards from their connection to the thills, as shown by fig. 1, which clearly illustrates my invention.

A is the breeching-strap, of leather, or its equivalent, of the usual degree of strength and width. This is attached on each side to the shaft by means of a loop or bolt, $a\ a$, curved in the manner shown. There is also a stay-strap, or its equivalent, B, across from one shaft to the other, and affixed in like manner as the breeching at $b\ b$, and connected centrally with one or more loops, C, or otherwise, to the breeching A. The breeching thus affixed to the shaft S is of the proper height for ordinary horses, and may readily be made adjustable to adapt the same to horses over or under the ordinary size, either in the shafts or bolts $a\ b$. I am aware that this may be deemed a very simple invention, but it cost me some study and experimenting to form the combination of the stay-strap and breech-band, and having tested its utility and convenience practically to my satisfaction, inasmuch that while I have nothing to do but to back the horse between the shafts, and affix the traces, so likewise in unhitching I do not only find it more convenient, but the hames and traces, with the saddle and girth, are sufficient; the latter portion of the harness is dispensed with. Besides, should even the breeching break, the stay-strap B would supply its place so as to check the vehicle in going down hill, and prevent an accident, which might occur when the ordinary breeching used would break. I am not aware that breeching has ever been applied in the manner herein set forth.

What I claim as my invention, and desire to secure by Letters Patent, is—

The combination and application of the breeching A, and stay-strap B, when affixed to the shafts of a vehicle in the manner and for the purpose specified.

JACOB B. LINDEMAN.

Witnesses:
WM. B. WILEY,
JACOB STAUFFER.